US006709098B1

(12) United States Patent
Wang Lee

(10) Patent No.: US 6,709,098 B1
(45) Date of Patent: Mar. 23, 2004

(54) LENS SECURING DEVICE FOR A PAIR OF EYEGLASSES

(76) Inventor: Anthony Wang Lee, No. 473, Chung-Shan S. Rd., Yung-Kang City, Tainan Hsien (TW)

( * ) Notice: Subject to any disclaimer, the term of this patent is extended or adjusted under 35 U.S.C. 154(b) by 4 days.

(21) Appl. No.: 10/402,113

(22) Filed: Mar. 28, 2003

(51) Int. Cl.[7] .................................................. G02C 1/00

(52) U.S. Cl. ............................................ 351/86; 351/83

(58) Field of Search .............................. 351/86, 83, 90, 351/92, 93, 103, 106, 41, 158

(56) References Cited

U.S. PATENT DOCUMENTS 6,193,367 B1 * 2/2001 Lee ............................ 351/86
6,386,704 B1 * 5/2002 Wu ............................ 351/106
6,517,202 B2 * 2/2003 Huang ........................ 351/103
6,523,952 B1 * 2/2003 Krumme ..................... 351/110

* cited by examiner

*Primary Examiner*—Hung X. Dang
(74) *Attorney, Agent, or Firm*—Dellett & Walters

(57) ABSTRACT

A pair of eyeglasses includes two frames each having a cutout defined in an outer periphery of the frame, two temples each pivotally connected to a corresponding one of the two frames and by a boss sandwiched between each of the temple and the corresponding frame, a bridge securely bridging the two frames together by an extension sandwiched between the bridge and a corresponding one of the two frames, two lenses each connected to a corresponding one of the two frames and having two notches oppositely defined in a side of the lens to respectively correspond to the extension and the boss and an indentation defined adjacent to one of the two notches to align with the cutout of the frame, and a positioning arm pivotally connected to the two frames to selectively combine the frames and the lenses.

4 Claims, 4 Drawing Sheets

51
50
11
11
10
41
20
32
31
31
30

20
10
11
50
51
41
11
31
30
32
31

20
21
30
10
50
11
51
32
12
41
31
121

20
21
30
10
11
50
51
32
12
121
41

LENS SECURING DEVICE FOR A PAIR OF EYEGLASSES

BACKGROUND OF THE INVENTION

1. Field of the Invention

The present invention relates to a lens securing device, and more particularly to a lens securing device in a pair of eyeglasses.

2. Description of Related Art

A conventional pair of eyeglasses has two frames each provided with a hole to securely receive therein a lens, a pair of nosepieces respectively formed on opposite sides of the two frames, a bridge bridging the two frames together and two temples each pivotally connected to a side of each of the two frames so that the user is able to use the pair of nosepieces as well as the temples to hang the pair of eyeglasses on the nose and the ears. The lenses of the eyeglasses are securely mounted on the frames so that when the user has to go outdoors on sunny days, the user will have to have a pair of secondary lenses to be detachably mounted on the two frames to function as a pair of sunglasses. Carrying around the secondary lenses is troublesome for the user and the secondary lenses are easily detached from the two frames, which causes a lot of problems for the user.

To overcome the shortcomings, the present invention tends to provide an improved lens securing device to mitigate and obviate the aforementioned problems.

SUMMARY OF THE INVENTION

The primary objective of the present invention is to provide an improved lens securing device for a pair of eyeglasses so that the lenses of the pair of eyeglasses are able to be detachably connected to the frames to enable the user to change the lenses easily when required.

In order to accomplish the foregoing objective, the securing device comprises a boss formed on a joint between the temple and each of the frames, a bridge bridging the two frames together by an extension sandwiched between the bridge and each of the two frames, a pair of notches adapted to be defined in opposite sides of the lens to correspond to the boss and the extension respectively and a positioning arm pivotally connected between the two frames to be seated in a cutout in each of the frames so that the lenses are able to be securely retained in the pair of eyeglasses or removed from pair of eyeglasses easily by pivoting the positioning arm to leave the corresponding cutouts.

Other objects, advantages and novel features of the invention will become more apparent from the following detailed description when taken in conjunction with the accompanying drawings.

DETAILED DESCRIPTION OF THE PREFERRED EMBODIMENT

Figure 1:
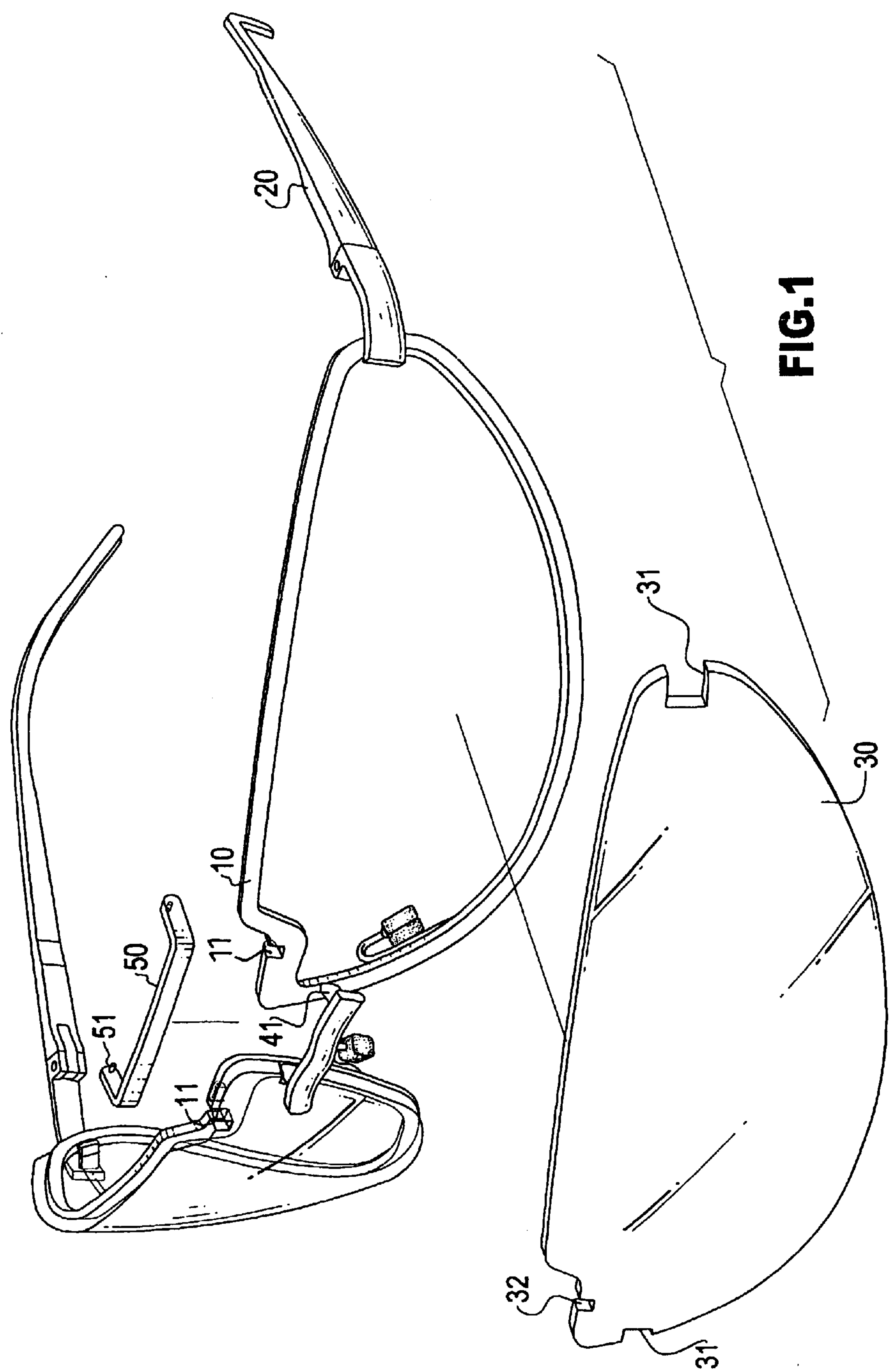
FIG. 1 is an exploded perspective view of the lens securing device of the present invention.
Figure 2:
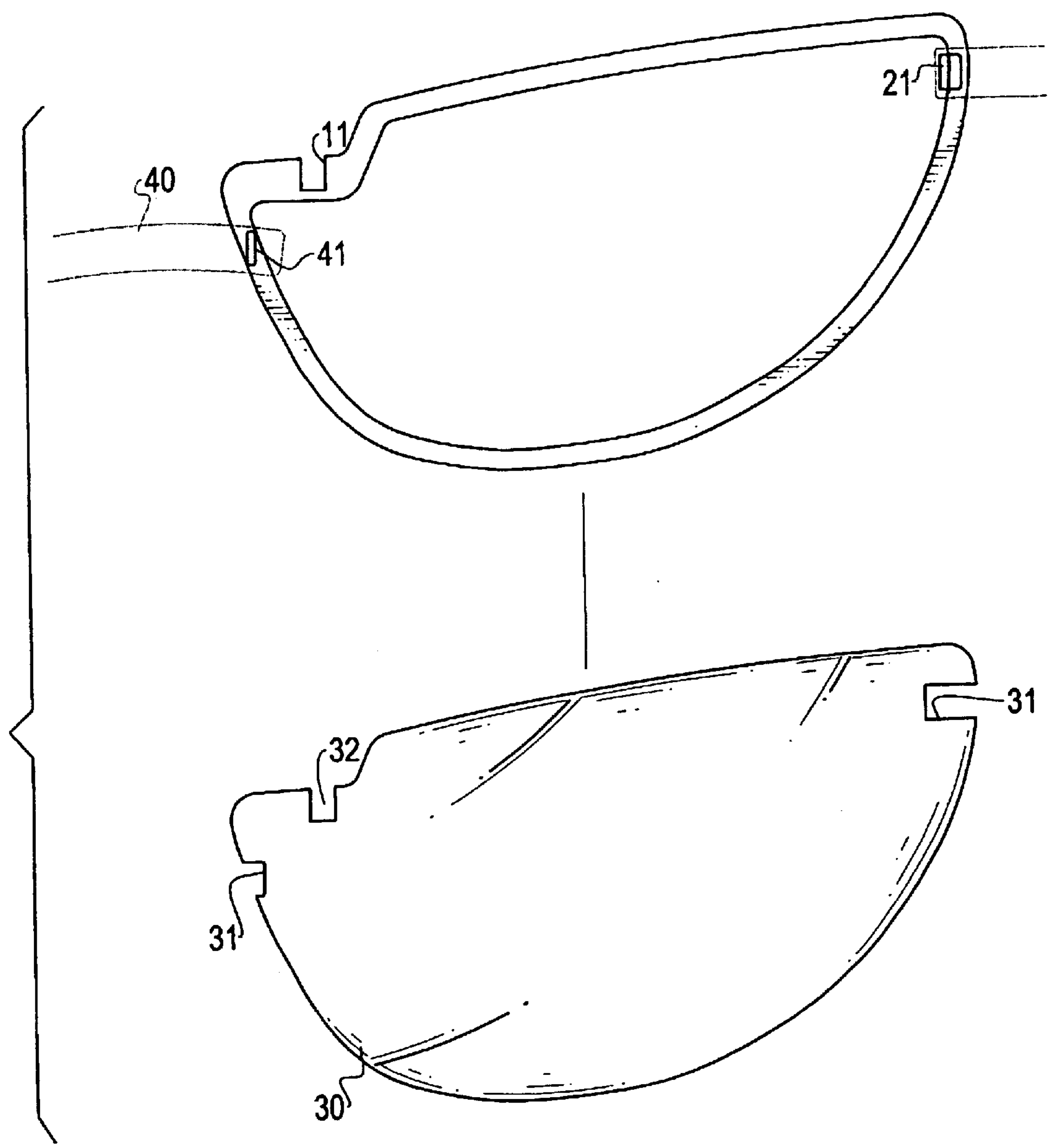
FIG. 2 is a plan view showing the lens and one of the frames before combination.

With reference to FIGS. 1 and 2, a pair of eyeglasses comprises two frames (10), two temples (20) each pivotally connected to a corresponding one of the two frames (10), two lenses (30) respectively corresponding to one of the two frames (10) and a bridge (40) securely sandwiched between the two frames (10).

Each of the frames (10) has a cutout (11) defined in a periphery thereof and each of the temples (20) has a boss (21) formed on a joint between the temple (20) and the frame (10). The lens (30) has two notches (31) oppositely defined in an outer periphery of the lens (30) and an indentation (32) defined adjacent to one of the notches (31). The bridge (40) is securely connected to each of the two frames (10) by an extension (41). A U-shaped positioning arm (50) with two pins (51) respectively formed on each of two distal ends of the positioning arm (50) is pivotally connected to the two frames (10). A pin hole (111) is defined in a side wall defining each of the cutouts (11) to correspond to the two pins (51) of the positioning arm (50).

Figure 3:
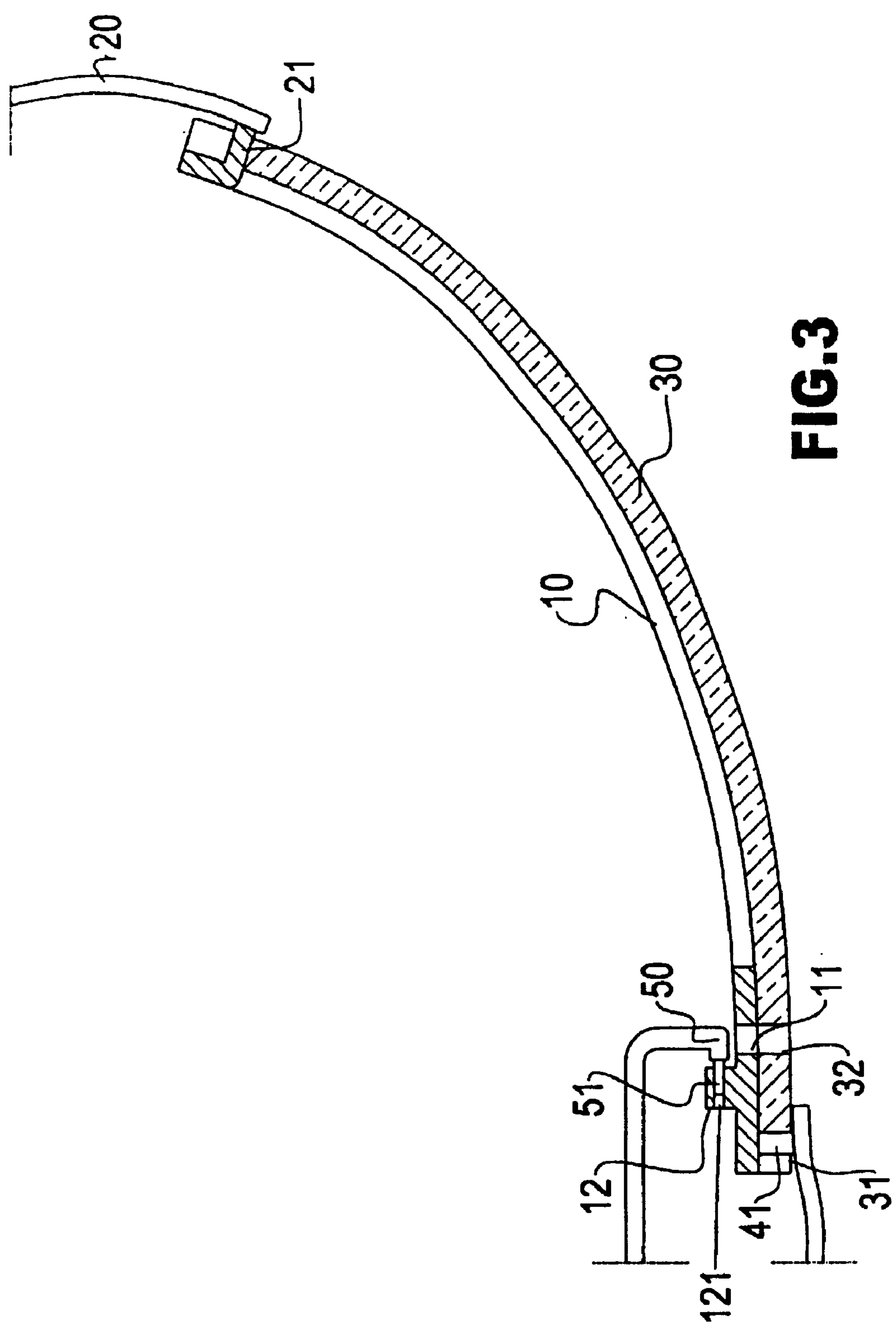
FIG. 3 is a schematic view showing that the lens is combined with the frame before the positioning arm is employed to secure the lens on the frame.

With reference to FIGS. 2 and 3, before each of the lenses (30) is connected to the corresponding one of the two frames (10), the lens (30) is placed in front of the corresponding frame (10) with the two notches (31) corresponding to and in alignment with the extension (41) and the boss (21) respectively. Because the lens (30) has a size the same as that of the frame (10), the lens (30) slides first to allow the extension (41) to be received in one of the notch (31). Then the lens (30) is placed to abut the frame (10) to have the boss (21) received in the notch (31) while aligning the cutout (11) and the indentation (32).

From the drawing of FIG. 3, it is noted that a protrusion (12) may be formed on a rear side face of the frame (10) and the protrusion (12) is provided with a pin hole (121) to correspond to the pin (51) of the positioning arm (50). Therefore, taking the embodiment shown in FIG. 3 for example, the pins (51) are inserted into the pin holes (121) of the protrusions (12) so that the positioning arm (50) is able to pivot relative to the frames (10) while the indentation (32) is in alignment with the cutout (11).

Figure 4:
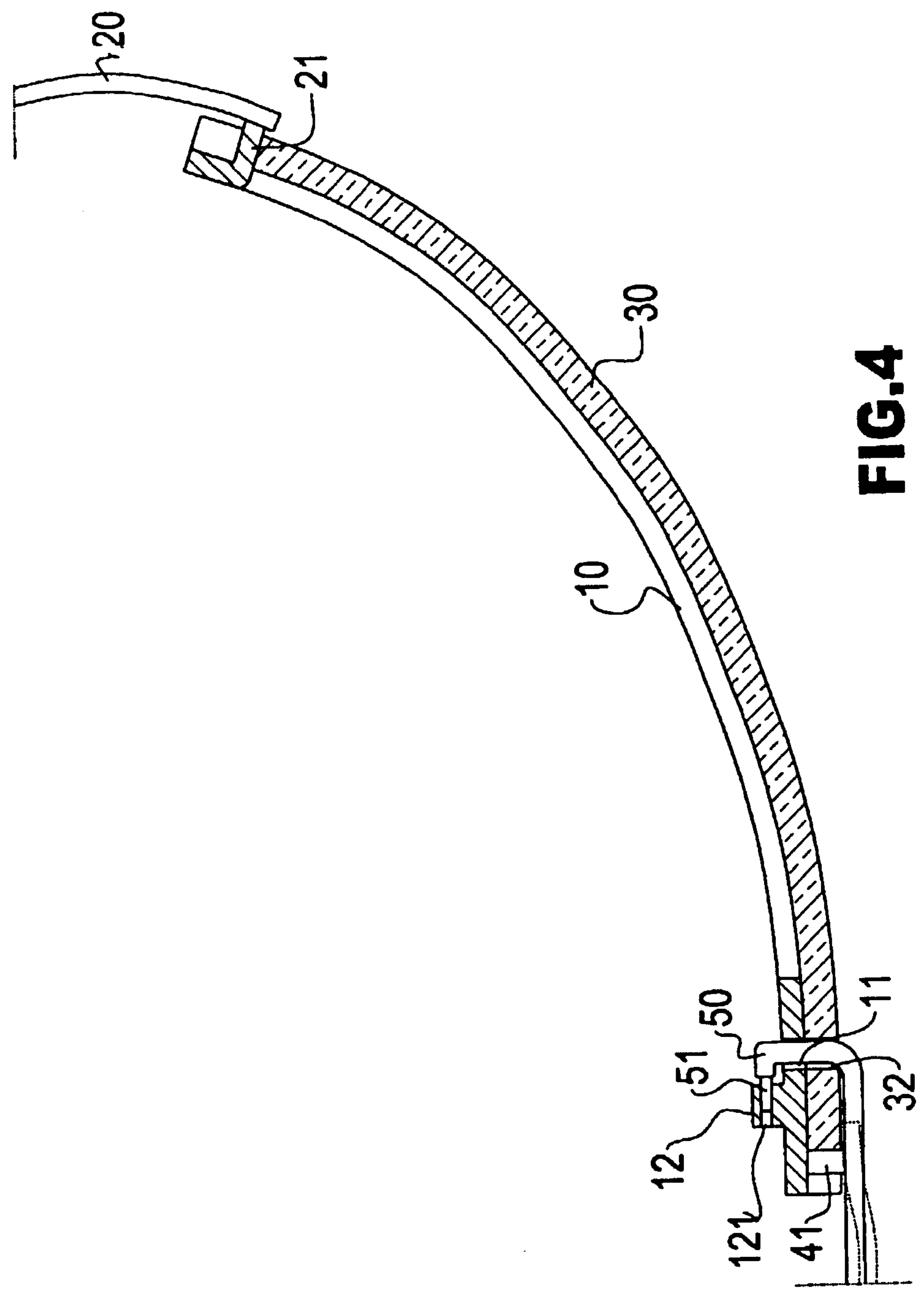
FIG. 4 is a schematic view showing that the lens is combined with the frame after the positioning arm is employed to be seated in the cutouts in each of the frames.

Thereafter, with reference to FIG. 4, the user may pivot the positioning arm (50) to place the positioning arm (50) in the aligned indentation (32) and the cutout (11) to secure engagement between the frame (10) and the lens (30).

It is noted that when there is no protrusion (12) formed on the rear side face of the frame (10), the pin hole is defined in the side face defining the cutout (11), which serves the same function as to allow the pin (51) to be inserted into the pin hole (111) so as to allow the positioning arm (50) to pivot relative to the frame (10). After the positioning arm (50) is pivotal relative to the frame (10), the positioning arm (50) is then able to be received in the aligned indentation (32) and the cutout (10) to secure the engagement between the lens (30) and the frame (10).

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A lens securing device for a pair of eyeglasses having two frames, two lenses each connected to a corresponding one of the two frames, two temples each pivotally connected to a corresponding one of the two frames and a bridge bridging the two frames together, the lens securing device comprising:

a cutout adapted to be defined in an outer periphery of each of the two frames;

a boss adapted to be formed on a joint between each of the temples and the corresponding one of the two frames;

two notches adapted to be oppositely defined in each of the two lenses;

an indentation adapted to be defined in each of the two lenses to align with the cutout of the frame;

an extension adapted to be sandwiched between a distal end of the bridge and each of the frames; and a positioning arm with two distal ends to be pivotally received in the two cutouts, whereby after the extension and the boss are received in the two notches, pivotal movement of the positioning arm is able to allow the positioning arm to be received in the aligned indentation and the cutout to secure engagement between the frame and the lens.

2. The lens securing device as claimed in claim 1, wherein two pins are formed on the two distal ends of the positioning arm and two pin holes are respectively defined in a side face defining the cutout to allow the pins to be received in the pin holes to allow the positioning arm to pivot relative to the two frames.

3. A pair of eyeglasses comprising:

two frames each having a cutout defined in an outer periphery of the frame;

two temples each pivotally connected to a corresponding one of the two frames and by a boss sandwiched between each of the temple and the corresponding frame;

a bridge securely bridging the two frames together by an extension sandwiched between the bridge and a corresponding one of the two frames;

two lenses each connected to a corresponding one of the two frames and having two notches oppositely defined in a side of the lens to respectively correspond to the extension and the boss and an indentation defined adjacent to one of the two notches to align with the cutout of the frame; and a positioning arm with two distal ends pivotally connected to the two frames to selectively combine the frames and the lenses by being received in the aligned indentation and the cutout after the extensions and the bosses are respectively received in the two notches of each of the two lenses.

4. The pair of eyeglasses as claimed in claim 3, wherein each of the frames further has a protrusion formed on a rear side face of the frame and a pin hole defined in the protrusion, two pins are formed on the two distal ends of the positioning arm to correspond to the two pin holes of the two protrusions of the two frames such that the positioning arm is able to pivot relative to the frames.

* * * * *